Figure 1:
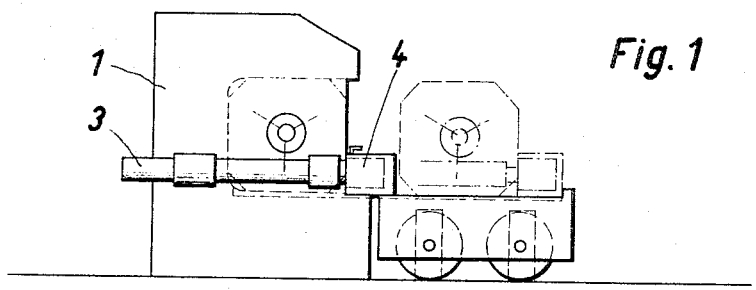

Feb. 28, 1967         W. VOM DORP ETAL         3,306,090
       EXCHANGE COUPLING APPARATUS FOR ROLLING MILLS, PARTICULARLY
          FOR ROLLING FRAMES FOR UNIVERSAL OR TUBE REDUCING MILLS
Filed May 14, 1964                                    4 Sheets-Sheet 1

Inventors:
WALTER VOM DORP
and HANS MEURER,

By
THEIR ATTORNEY

Inventors:
WALTER VOM DORP and
HANS MEURER

Feb. 28, 1967 W. VOM DORP ETAL 3,306,090
EXCHANGE COUPLING APPARATUS FOR ROLLING MILLS, PARTICULARLY
FOR ROLLING FRAMES FOR UNIVERSAL OR TUBE REDUCING MILLS
Filed May 14, 1964 4 Sheets-Sheet 4

Inventors.
WALTER VOM DORP and
HANS MEURER,
By [signature]
Their Attorney.

United States Patent Office 3,306,090
Patented Feb. 28, 1967

3,306,090
EXCHANGE COUPLING APPARATUS FOR ROLLING MILLS, PARTICULARLY FOR ROLLING FRAMES FOR UNIVERSAL OR TUBE REDUCING MILLS
Walter vom Dorp, Rheydt, and Hans Meurer, Neuss (Rhine), Germany, assignors to Mannesmann-Meer Aktiengesellschaft, a corporation of Germany
Filed May 14, 1964, Ser. No. 367,421
Claims priority, application Germany, May 15, 1963, M 56,817
5 Claims. (Cl. 72—239)

The invention relates to rolling mills and relates more particularly to exchange coupling apparatus for the quick exchange of rolling frames in reducing mills.

For a quick exchange of rolling frames, the related industry has developed a great variety of apparatus; these apparatus afforded to the rolling mill a choice ranging from individual disassembling by means of cranes to the simultaneous collective disassembling by means of special extension machinery.

For transporting the rolling frames to and fro, there are several possibilities available today that range from conveyors on rails or suspension beams to rotation by means of turntables, and include holding the rolling frames in reserve in a special exchange position.

In order generally to increase the efficiency of such a rolling mill, including the manufacture as well as the plant, its supervision and maintenance, improvements will need to be made; in order to determine the nature of these improvements, it will be necessary to examine critically not only the time factor but also ways for the most economical use of the plant.

This critical examination does not only encompass the space requirements for the finishing roll train, but also the arrangement of the necessary special machinery for mounting purposes, such as exchange apparatus which in their present form, due to their bulky construction, renders difficult the maintenance and observation.

It is accordingly among the principal objects of the invention to provide a mechanism for the lateral horizontal movement of the rolling frames to and from their working position on the bed of the roll train machinery, and for the clamping of the rolling frames in their working position perpendicularly to the rolling direction.

It is another object of the invention to provide such a mechanism which, following an interchange of rolling frames, will have one side which is parallel to the row of rolling frames unobstructed of all auxiliary devices or drive means, to facilitate observation and maintenance of the machinery.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in the specification.

According to the invention, the foregoing objects are attained by means of an exchange coupling apparatus either in its basic construction or modifications thereof.

In its basic construction, the apparatus comprises moving cylinders of conventional construction, namely either hydraulic moving cylinders or electric moving cylinders. Two of these cylinders are provided, one at the entrance point and the other at the exit point for the tube on the roll train, and these cylinders are connected to opposite ends of a slidable beam to which the individual rolling frames may quickly and easily be removably connected.

In accordance with a first modification, this slidable beam may slide on the frame bed, lying sideways horizontally on it, or it may be carried on special swivel arms midway to the vertical rolling plane. Thus, according to space conditions, the conveyor of the exchange rolling frames which may, for instance, be a vehicle of well-known construction, may move parallel to the rolling direction and/or transverse thereto.

It is likewise possible that in view of the arrangement of the drive-ins and drives of the rolls, each frame may be moved out by an individual shiftable cylinder, so that the slidable beams may be dispensed with.

The choice of the exchange apparatus—either with or without slidable beam—thus depends on the type and position of the drive-ins with relation to the roll heads; the choice, therefore, first depends on the availability of space within the roll train. The choice may, however, be decisively influenced by the availability of space in the immediate vicinity of the roll train in reference to the direction of movement of the conveyor.

All exchange apparatus, however, have in common the need for retaining or clamping of the rolling frames transversely to the rolling direction in work position; this is accomplished by the aforesaid moving cylinders, be they of the hydraulic or electric type according to choice, so that additional equipment is not needed for that purpose.

In order to prevent tilting of the rolling frames, the rolling frames may be clamped in the rolling direction, for instance by means of pressure pins which are applied vertically at the center of the axis and which are operated hydraulically or pneumatically; they may utilize the specially provided guiding grooves to clamp the frames, so that in mounting and dismounting of the rolling frames considerable time and power is saved because of the reduced tightness of fit in the guiding grooves.

Another possibility for carrying out axial tightening are the so-called lateral pressure boxes.

The foregoing provides for machinery which is developed from one basic construction with the aid of simple means and but few disturbances.

The invention accordingly comprises the features of construction, combination of elements and arrangement of parts which will be exemplified in a construction hereinafter set forth and the scope of the application of which will be indicated in the claims.

Figure 2:
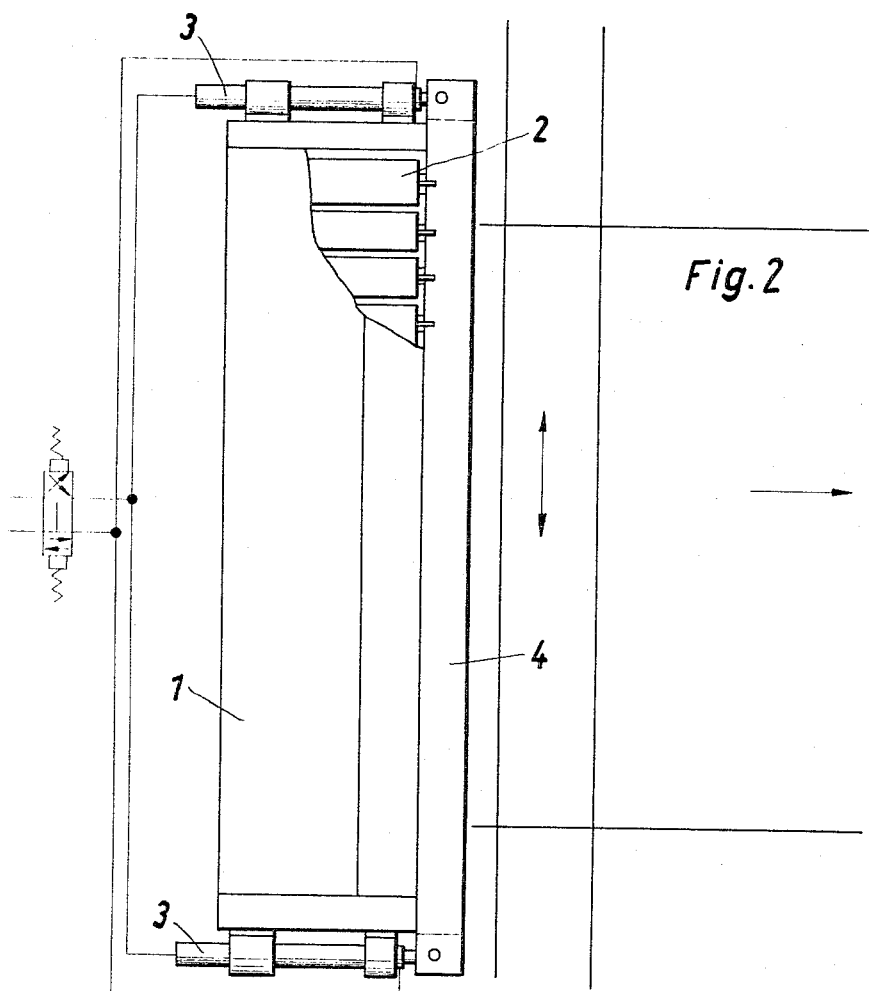
Figure 3:
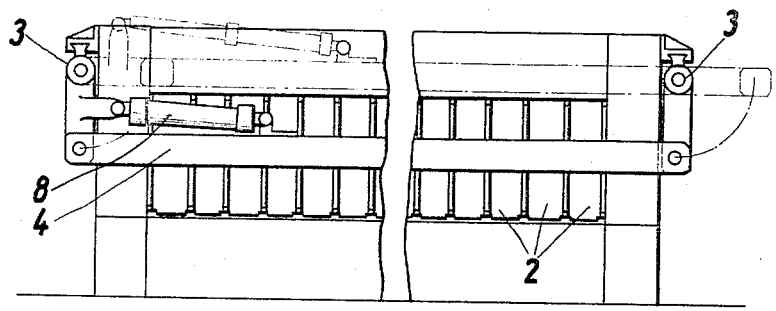
Figure 4:
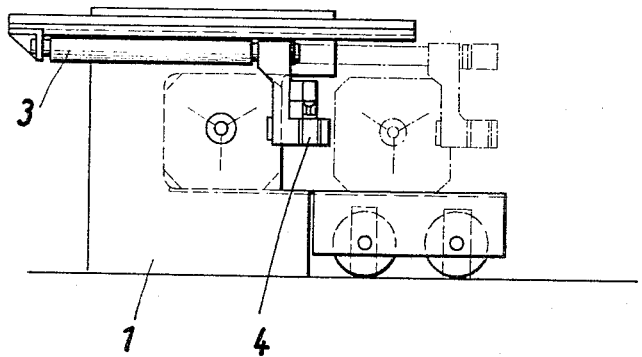
Figure 5:
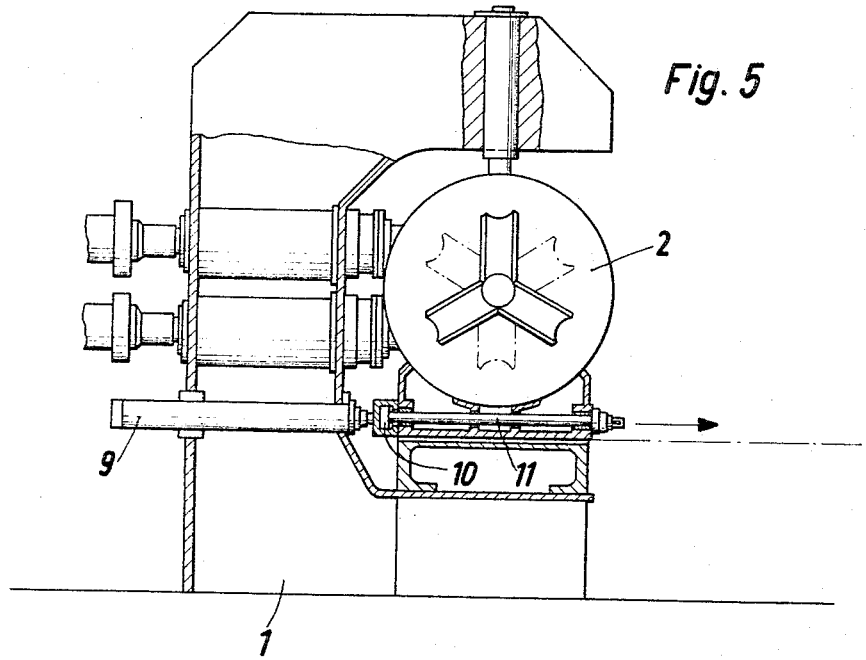
Figure 6:
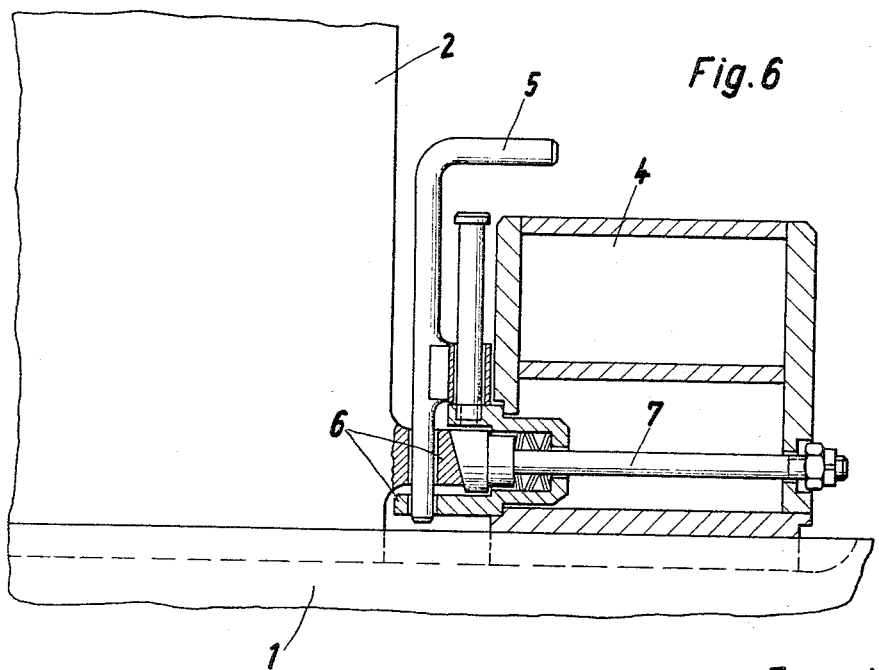
Figure 7A:
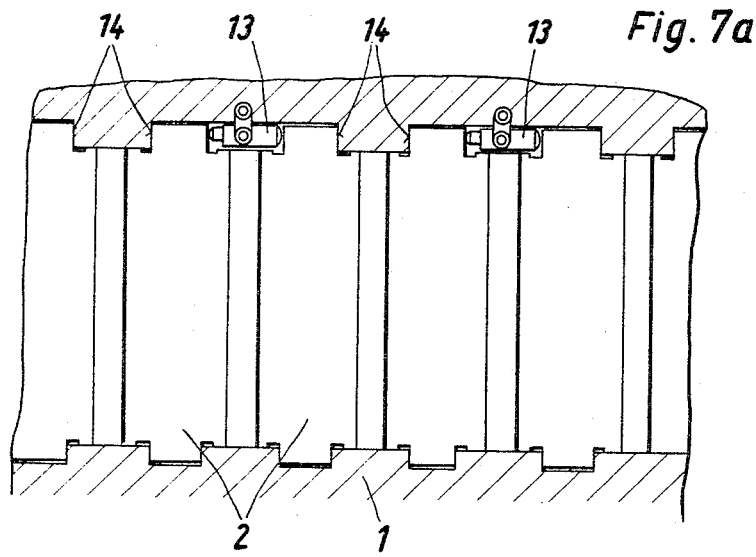
Figure 7B:
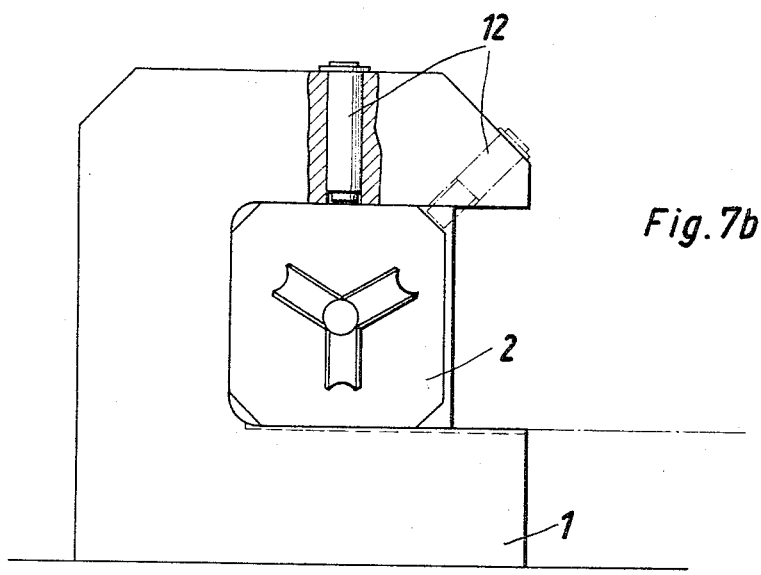

In the accompanying drawings,
FIG. 1 is an end elevational view of an exchange coupling apparatus of generally basic construction;
FIG. 2 is a plan view thereof;
FIG. 3 is a plan view of a modified exchange coupling apparatus;
FIG. 4 is an end elevational view thereof;
FIG. 5 is a fragmentary vertical sectional view of a still further modified exchange coupling apparatus;
FIG. 6 is a fragmentary elevational view, partly in section, showing a detail of the embodiments of FIGS. 1 and 2;
FIG. 7a is a fragmentary plan view, partly in section, showing a series of rolling frames; and
FIG. 7b is an end elevational view, partly in section, similar to FIG. 5, but embodying a modification.

In carrying the invention into effect in the embodiments which have been selected for illustration in the accompanying drawings and for description in this specification, and referring now particularly to FIGS. 1, 2 and 6, there is provided a reducing rolling mill which comprises a frame bed 1 of a roll train that is adapted to receive a series of adjoining rolling frames 2. The rolling frames 2 during exchange are movable sideways horizontally.

The frame bed 1, furthermore, holds the respective drives for the rolls; these rolls may be arranged in different position depending on the entire arrangement.

FIGS. 1, 2 and 6 show the basic construction of the exchange coupling apparatus which comprises moving cylinders 3 either of the hydraulic or electric type of well-known conventional construction. The cylinders 3 are arranged at the entrance and exit points of the tube to be rolled, and are connected to the opposite ends of a shiftable beam 4, the connection being pivotable and easily detachable.

The shiftable beam 4 which is slidable horizontally on the frame bed 1 is releasably coupled, as best shown in FIG. 6, to the rolling frames 2 by pins 5 and tongues 6 which balance in their working position, by means of a pressing rod 7, resiliently under the pressure of springs that surround the rod 7.

During the interchange of rolling frames, this basic construction requires the presence of a substitute shiftable beam, as the beam will accompany the exiting rolling frames on the conveyors after it has been uncoupled from the moving cylinders and, accordingly, will be returned with the exchange rolling frames.

FIGS. 3 and 4 show the modified basic construction that does not need any substitute shiftable beam, as the beam, after the frames have been extended, may be swung upwardly or sidewardly and thus will clear the path of the conveyor means for the shifting. This construction however, in addition to the two movable cylinders 3, for the extension by means of the beams 4, furthermore needs another moving cylinder 8 which pivotably moves the shiftable beam 4 either upwardly or sidewardly.

FIG. 5 shows the second modification of the basic construction which, however, may be realized only where the entry into the rolls leaves sufficient space for the individual cylinders 9. This construction dispenses with the shiftable beam of the previous embodiment, and provides for the sideward movement of the rolling frames by the cylinders 9. The cylinders 9 are so controlled among each other that it is possible to exchange single rolling frames as well as entire groups of frames or all of the frames. The pistons of the cylinders 9 are so coupled to the frames 2 by means of clutches 10, that the clutches 10 may be connected and, respectively, disconnected, for example by turning of the bolts 11.

FIGS. 7a and 7b show an example of the dependency of any slight displaceability of the rolling frames 2 from the overall exchange procedure. Here the manner of coupling the rolling frames in axial direction in the guiding grooves of the framework greatly influences the exact position of the individual frames and their facile shiftability.

As shown in FIGS. 7a and 7b, there are provided vertical or inclined movable clamping bolts 12 which produce clamping pressure; or lateral pressure boxes or jacks 13 may be provided which are always mounted between two rolling frames 2 pressing them axially of the rolling direction towards the pressure walls 14 of the bed. The heretofore customary tight fit of the frames in the guiding grooves of the bed may thus be avoided.

In summary, it may be pointed out that, aside from the moving cylinders, all constructions offer the possibility to hold and to move the rolling frames in their work position transverse to the rolling direction by means of the moving cylinders.

It is up to the manufacturer to choose which exchange equipment is most economical for his production and specific conditions. For instance, if it is necessary that every roll is driven individually and the removal of the exchange framework is in the immediate vicinity of the rolling mill transverse to the rolling direction, then there should be used the basic construction with the shiftable beam.

If, on the other hand, transporting transverse and also parallel to the rolling direction is necessary, the shiftable beam should be chosen that is suspended centrally and admits of swiveling.

If, however, the manufacture calls for a direct roll drive-in with bevel gear transmission on the rolls, the exchange of the rolling frames by means of individual moving cylinders for each frame is recommended, wherein furthermore transportation may take place parallel as well as transverse of the rolling direction.

Certain of the advantages of the invention have already been herein referred to. It may be useful, however, to allude particularly at this point to its variability of embodiments which are characterized by a simple construction and only few means, wherein several manipulations may be carried out with a single piece of equipment, reducing additional manipulations to a minimum. At the same time, the requirement for purposeful utilization of space is fulfilled, as all exchange equipment of the apparatus keeps free from auxiliary apparatus one side along the machine for better maintenance and supervision of the rolls and the rolling process.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. Exchange coupling apparatus, for use in connection with rolling frames in reducing rolling mills including a roll train having a bed, said apparatus being adapted to hold the rolling frames transverse to the rolling direction in their working position on the bed, and during the exchange to shift the frames laterally horizontally to and from their working position and comprising, in combination, a shiftable beam, two moving cylinders connected with relation to the bed, one near the entry side and the other near the exit side of the roll train and being movably and releasably connected to said beam, said beam being adapted to be coupled to the rolling frames and sliding on the bed during the exchange move of the frames to and from the working position.

2. Exchange coupling apparatus, as claimed in claim 1, said bed having guiding grooves for retaining said rolling frames, characterized in that for clamping the rolling frames in rolling direction and for facilitating their exchange a shifting clamping means is disposed in the guide grooves of the bed between two rolling frames.

3. In an exchange coupling apparatus, as claimed in claim 2, said clamping means comprising pressing the frames to the walls of the bed.

4. In an exchange coupling apparatus, as claimed in claim 2, said clamping means comprising hydraulic cylinders releasably clamping each frame axially.

5. In an exchange coupling apparatus, according to claim 1, characterized in that the moving cylinders and the shiftable beam are operable to change their vertical position, said beam including swivel arms, whereby the suspended beam will grip the frames with the swivel arms centrally of the vertical rolling plane.

References Cited by the Examiner

UNITED STATES PATENTS

| | | | |
|---|---|---|---|
| 749,745 | 1/1904 | Von Philip | 72—239 |
| 2,829,697 | 4/1958 | Rackhoff et al. | 72—239 |
| 3,136,182 | 6/1964 | Wegmann et al. | 72—238 |

CHARLES W. LANHAM, *Primary Examiner.*